(12) United States Patent
Flehmig et al.

(10) Patent No.: US 9,296,383 B2
(45) Date of Patent: Mar. 29, 2016

(54) COLLISION AVOIDANCE FOR A MOTOR VEHICLE

(71) Applicants: Folko Flehmig, Stuttgart (DE); Christian Braeuchle, Hassmersheim-Hochhausen (DE)

(72) Inventors: Folko Flehmig, Stuttgart (DE); Christian Braeuchle, Hassmersheim-Hochhausen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/308,031

(22) Filed: Jun. 18, 2014

(65) Prior Publication Data

US 2014/0379167 A1     Dec. 25, 2014

(30) Foreign Application Priority Data

Jun. 20, 2013   (DE) .......................... 10 2013 211 622

(51) Int. Cl.
*B60W 10/18*   (2012.01)
*B60W 10/20*   (2006.01)
*B60W 30/09*   (2012.01)
*B60W 50/00*   (2006.01)

(52) U.S. Cl.
CPC ............... *B60W 10/18* (2013.01); *B60W 10/20* (2013.01); *B60W 30/09* (2013.01); *B60W 50/0097* (2013.01)

(58) Field of Classification Search
CPC . B60W 30/09; B60W 50/0097; B60W 10/18; B60W 10/20
USPC ............................................................. 701/1
See application file for complete search history.

(56) References Cited

U.S. PATENT DOCUMENTS

| | | | |
|---|---|---|---|
| 2008/0065328 A1* | 3/2008 | Eidehall et al. | 701/301 |
| 2008/0303696 A1* | 12/2008 | Aso et al. | 340/935 |
| 2009/0076702 A1* | 3/2009 | Arbitmann et al. | 701/96 |
| 2014/0039676 A1* | 2/2014 | Fernando et al. | 700/253 |
| 2014/0067206 A1* | 3/2014 | Pflug | 701/41 |

OTHER PUBLICATIONS

U.S. Appl. No. 61/696416, filed Sep. 4, 2012.*

* cited by examiner

*Primary Examiner* — Fadey Jabr
*Assistant Examiner* — Yazan A Soofi
(74) *Attorney, Agent, or Firm* — Kenyon & Kenyon LLP

(57) ABSTRACT

A method for determining a driving maneuver for a motor vehicle includes the steps of ascertaining an imminent accident with an external object, ascertaining characteristic variables for accident damages in different driving maneuvers and determining the driving maneuver whose characteristic variable is indicative of the least accident damage.

19 Claims, 3 Drawing Sheets

COLLISION AVOIDANCE FOR A MOTOR VEHICLE

RELATED APPLICATION INFORMATION

The present application claims priority to and the benefit of German patent application no. 10 2013 211 622.5, which was filed in Germany on Jun. 20, 2013, the disclosure of which is incorporated herein by reference.

FIELD OF THE INVENTION

The present invention relates to a technique for collision avoidance for a motor vehicle. The present invention relates in particular to a collision avoidance between a motor vehicle and an external object.

BACKGROUND INFORMATION

A motor vehicle includes a driver assistance system for increasing active safety. This system is configured for the purpose of preventing an accident between the motor vehicle and an external object and to reduce the consequences of the accident. There are known systems which intervene in longitudinal dynamics of a vehicle in the event of an imminent accident. These include, for example, a brake assistant which triggers emergency braking of the motor vehicle when it is determined that a collision between the motor vehicle and the external object is imminent. Other systems intervene in the transverse dynamics of the vehicle. An attempt may be made to bypass the external object by intervening in the steering of the motor vehicle. Both systems are based on predicting the future behavior of the external object as accurately as possible.

Another system, which may result in different driving maneuvers to prevent an imminent collision, determines which one of a number of different maneuvers reliably avoids the collision and then it carries out that maneuver. Full braking may be carried out if there is no driving maneuver available which reliably prevents the collision.

It is believed that it may well be impossible to prevent a collision in all situations.

SUMMARY OF THE INVENTION

An object of the present invention is therefore to provide a method, a computer program product and a device with the aid of which an improved determination of a driving maneuver to prevent or mitigate the consequences of a collision between a motor vehicle and an external object is to be made available.

The present invention may achieve these objects with the aid of a method, a computer program product and a device having the features described herein.

The method according to the present invention for determining a driving maneuver for a motor vehicle includes the steps of ascertaining an imminent accident with an external object, ascertaining characteristic variables for accident damage associated with different driving maneuvers and determining the driving maneuver whose characteristic variable is the lowest or indicates the least accident damage.

The consequences of the accident may be minimized by minimizing the characteristic variable. Even in cases in which the accident cannot be avoided entirely, a driving maneuver which at least ensures that the damage will be limited may be determined. The driving maneuver may thus be adapted to the present driving situation of the motor vehicle in an improved manner. Any damage avoidance potential may be utilized better in this way. In an exemplary manner, it is assumed here that a high characteristic variable is indicative of great accident damages, although the opposite relationship is also possible.

In one specific embodiment, one of the driving maneuvers is the instantaneous driver-controlled driving maneuver, and the driving maneuver whose characteristic variable is the farthest below the characteristic variable of the instantaneous driving maneuver is determined.

It is possible in this way to avoid determining a driving maneuver, which is not as good as the driver-controlled driving maneuver, based on the accident consequences. It is thus possible to prevent an increase in the accident consequences as a result of determining a suboptimal driving maneuver.

The characteristic variables may each relate to a probability of accident damages which are greater than a predetermined value. Different driving maneuvers may therefore be made available for accident severities, which may be assumed to be of different sizes. It is thus possible to further increase the appropriateness of the driving maneuver for the driving situation of the mobile vehicle thus made available.

The motor vehicle may then also be controlled to carry out the driving maneuver thereby determined. A driving maneuver caused by the driver may be overridden or aborted. A driving maneuver caused by the driver may be intensified, for example, by intensifying the braking or by increasing a steering angle.

The control may include in particular releasing brakes, changing the steering angle or accelerating the motor vehicle. A driving potential of the present motor vehicle may be fully utilized in this way, regardless of the capabilities and decisions of the driver. In another specific embodiment, there may also be an interaction with a driver of the motor vehicle, the interaction suggesting a response by the driver, which causes the driving maneuver thereby determined. For example, a loud acoustic signal may be output to prompt the driver to carry out emergency braking.

In one specific embodiment, a collision speed of the motor vehicle with the object is determined for each driving maneuver, and the characteristic numbers are determined on the basis of the collision speeds. Uncertain information, for example, measured data containing errors or predictions of movements, may therefore be incorporated in the determination.

In a particular specific embodiment, a distribution density of collision speeds of the motor vehicle with the object is determined for each driving maneuver, and the characteristic numbers are determined on the basis of the distribution densities. The driving maneuver may thus also be determined on the basis of fuzzy data using a statistical arrangement.

In another specific embodiment, the object includes a person, and the characteristic numbers each take into account one arrangement of transport of the person. Thus, for example, it is possible to take into account to which extent a different motor vehicle, a motorcycle or bicycle will protect the person actively or passively.

In one specific embodiment, the characteristic variables are based on personal injury. The personal injury may occur either inside or outside the motor vehicle. If the object includes a person, for example, then accident damage to a person inside the motor vehicle may also be taken into account. In another specific embodiment, the method relies specifically on an imminent accident between the motor vehicle and a pedestrian. In this case, the personal injury may be determined only on the basis of the injury to the person outside of the motor vehicle.

In yet another specific embodiment, the characteristic numbers take into account a collision point of the object on the motor vehicle. The collision point indicates on which surface of the motor vehicle the collision with the object is to take place. Active or passive safety of the motor vehicle at the collision point, which was previously determined empirically or structurally, for example, may be used for an improved determination of the characteristic numbers in this way. In another specific embodiment, a probability distribution over multiple collision points may also be used for determination of the characteristic numbers.

A computer program product according to the present invention includes program code arrangement for carrying out the method described here when the computer program product is running on a processing unit or is saved on a computer-readable data medium.

The device according to the present invention for determining a driving maneuver for a motor vehicle includes a detection unit for detecting an external object and a processing unit for carrying out the method described above.

The present invention will now be described in greater detail with reference to the accompanying figures.

DETAILED DESCRIPTION

Figure 1:
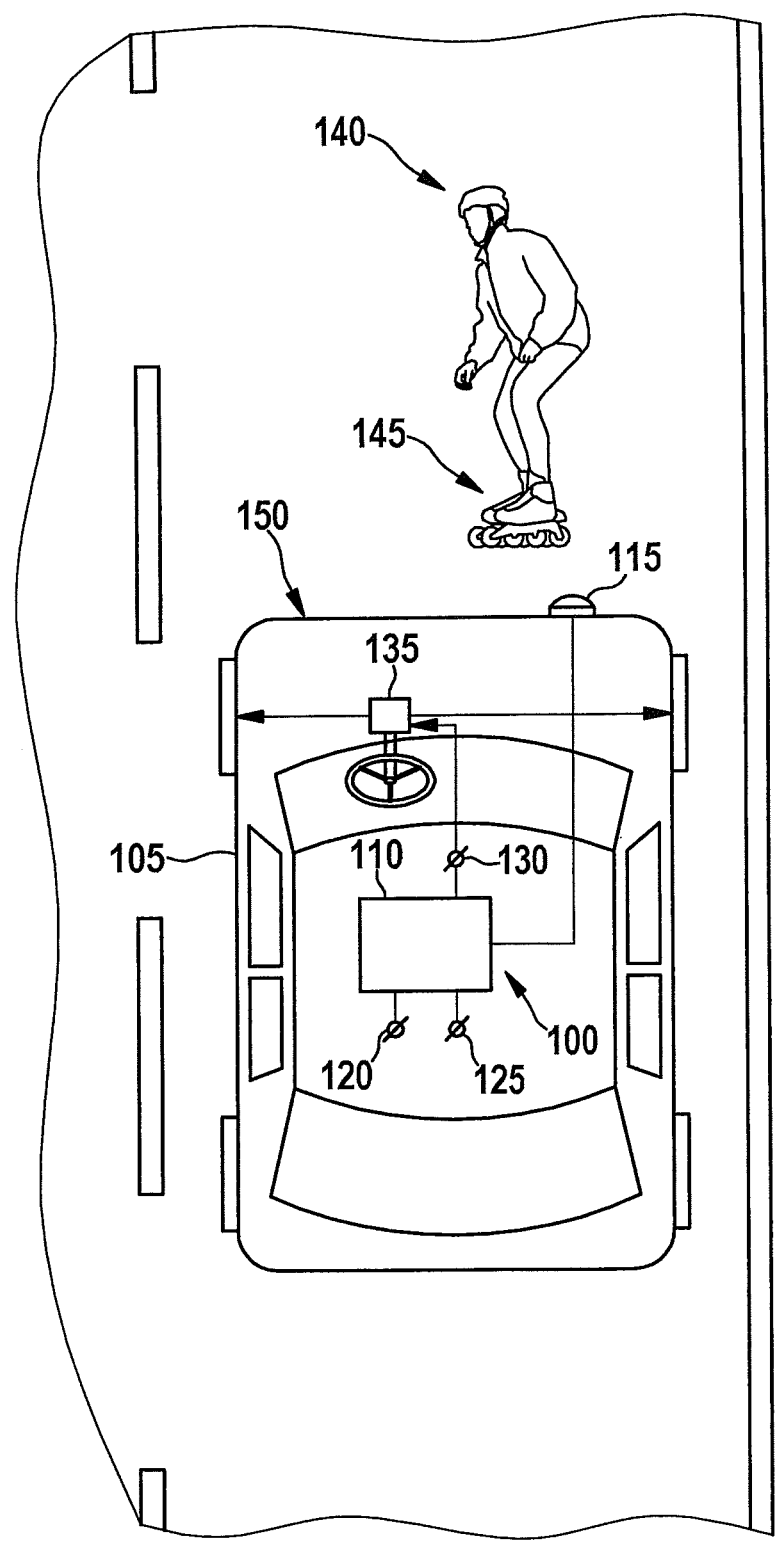
FIG. 1 shows a device for determining a driving maneuver on board a motor vehicle.

FIG. 1 shows a device 100 for determining a driving maneuver on board a motor vehicle 105. Device 100 includes a processing unit 110, which is connected to a detection unit 115. Device 100 may also include at least one of three interfaces. A first interface 120 is configured for connection to an engine control of a drive engine of motor vehicle 105, a second interface 125 is configured for connection to a brake control of motor vehicle 105, and a third interface 130 is configured for connection to a steering 135 of motor vehicle 105.

Processing unit 110 is configured to determine a driving maneuver for motor vehicle 105 and, if necessary, to trigger vehicle 105 with the aid of signals to at least one of interfaces 120 through 130 to carry out the determined driving maneuver.

Detection unit 115 is configured to detect an object 140 in an area outside of motor vehicle 105. Detection unit 115 may include one or multiple sensors, including a radar sensor, a LIDAR sensor, a camera or another sensor, for example. Detection unit 115 may also be configured to detect multiple objects 140. A detection area of detection unit 115 usually extends essentially in the direction of travel of motor vehicle 105.

Object 140 may include a stationary object or a road user. The road user may be an arrangement of transportation 145, for example, another motor vehicle, a motorcycle, a bicycle, the roller blade shown here as an example or no arrangement of transportation 145 at all if the road user is a pedestrian.

Processing unit 110 determines the driving maneuver for motor vehicle 105 on the basis of object 140 detected with the aid of detection unit 115. For this purpose, processing unit 110 is configured in particular to predict locations of object 140 and of motor vehicle 105 for future points in time. The driving maneuver is determined in general in such a way that accident damage resulting from a collision of motor vehicle 105 with object 140 may be minimized.

In one specific embodiment, processing unit 110 is also configured to determine in advance a collision point 150 on motor vehicle 105 on which a collision between object 140 and motor vehicle 105 will presumably take place. The effect of a passive safety system of motor vehicle 105 may be assigned to collision point 150. It is thus possible to take into account in this way the fact that a pedestrian may suffer injuries of varying severity, depending on whether he/she comes in contact with a collision point 150 located at a low level above the ground or with a high collision point 150 near the head.

Figure 2:
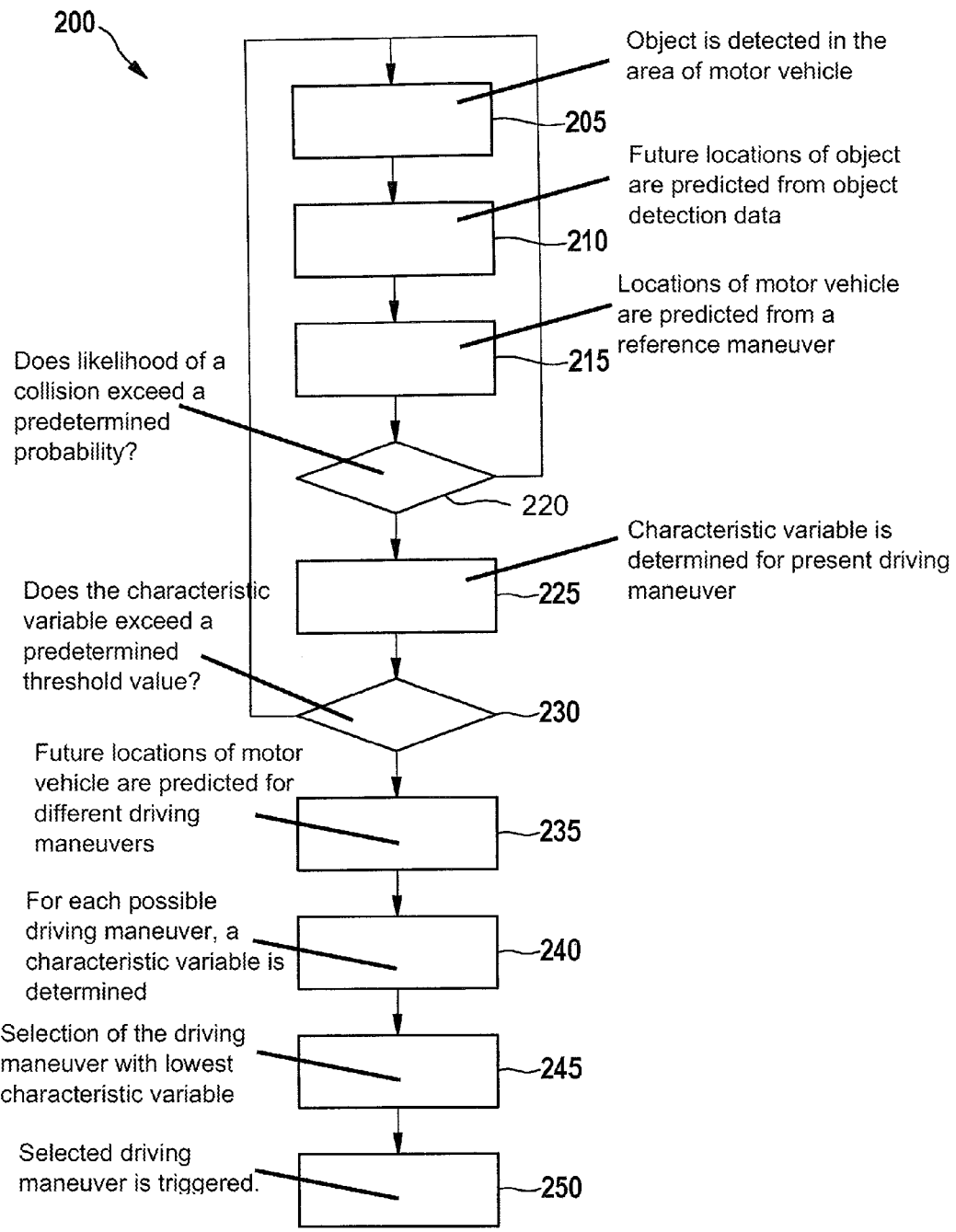
FIG. 2 shows a flow chart of a method for determining the driving maneuver on board the motor vehicle from FIG. 1.

FIG. 2 shows a flow chart of method 200 for determining the driving maneuver on board motor vehicle 105 from FIG. 1. Method 200 is prepared for execution on processing unit 110 in particular.

In a first step 205, object 140 is detected in the area of motor vehicle 105. Detection unit 115 may be used for detecting. This step and the following steps may also be carried out for multiple objects 140, but the present description is limited to the case of only one object 140 as an example.

In a step 210, the future locations of object 140 are predicted on the basis of detection data on the object. The locations may be given as combinations of positions, directions of movement, speeds of movement and accelerations. In another specific embodiment, distribution densities of speeds of object 140 may be determined. Thereby, uncertain measured values or assumptions may be modeled in this way in particular.

Similarly, locations of motor vehicle 105 are predicted on the basis of a reference maneuver in a step 215. The reference maneuver may include the instantaneous driving maneuver or a standard maneuver, for example, emergency braking. The locations may be given, such as the locations of object 140, or a trajectory may be determined for motor vehicle 105.

In an optional step 220, it is determined whether an accident, i.e., a collision between motor vehicle 105 and object 140, exceeds a predetermined probability. If this is not the case, method 200 returns to step 205 and may be run through again.

In a step 225, a characteristic variable, which characterizes the size of an accident damage, is determined under the assumption of the present driving maneuver. Increasing characteristic variables may optionally indicate greater or lesser damages; a direct relationship between characteristic variable and accident damage is assumed below, i.e., the greater the characteristic variable, the greater is also the determined accident damage. In one specific embodiment, the characteristic number may denote a probability that a person will suffer an injury of a severity which is above a predetermined value. The severity of the injury may be stated, for example, on the MAIS scale (maximum abbreviated injury scale). The predetermined value may be 2 or 3, for example. The person may be encompassed by object 140 or may be on board motor vehicle 105. The determination of the characteristic variable may include the speed at which a collision takes place between motor vehicle 105 and object 140, which collision point 140 is anticipated on motor vehicle 105, which arrangement of transportation 145 is used by a person encompassed by object 140 and other parameters, if necessary.

In an optional step 230, it is determined whether the characteristic variable determined previously exceeds a predetermined threshold value. If this is not the case, then the risk of an imminent accident is not assessed as being critical. In this case, method 200 returns to step 205 and may be run through again. It is thus possible to ensure that the procedure described below will take place only when one must assume a critical situation.

Otherwise, in a step 235, future locations of motor vehicle 105 are predicted under the assumption of other driving maneuvers. For each driving maneuver used as a basis, a characteristic variable is determined in a step 240 as in step 225.

In a step 245, that one driving maneuver is then selected whose assigned characteristic variable is the lowest or which indicates the least accident damage. In one specific embodiment, a gain which is to be achieved by selecting one of the driving maneuvers from step 235 over the driving maneuver from step 215 may be determined for the comparison. This gain may be determined by differences in the characteristic variables of the additional driving maneuver from the characteristic variable of the instantaneous driving maneuver.

In one specific embodiment, the result is additionally standardized to the characteristic variable of the instantaneous driving maneuver. For this purpose, the determined difference is therefore divided by the characteristic variable, which is assigned to the instantaneous driving maneuver. This determination may be used in particular for the probabilities of predetermined injury severities mentioned with respect to step 225.

In an optional step 250, motor vehicle 105 may be triggered with the aid of signals via one or multiple interfaces 120 through 130 to carry out the driving maneuver selected in step 245.

Starting from step 250, method 200 may also return to step 205 and run through it again. This may also take place while the determined driving maneuver is being carried out in order to take into account any changes in the driving situation, if necessary.

It should be pointed out that the indicated sequence of steps 205 through 250 need not necessarily be maintained. Other sequences are also possible. For example, steps 235 and 240 may also be carried out prior to steps 205 through 230 and 240.

Figure 3:
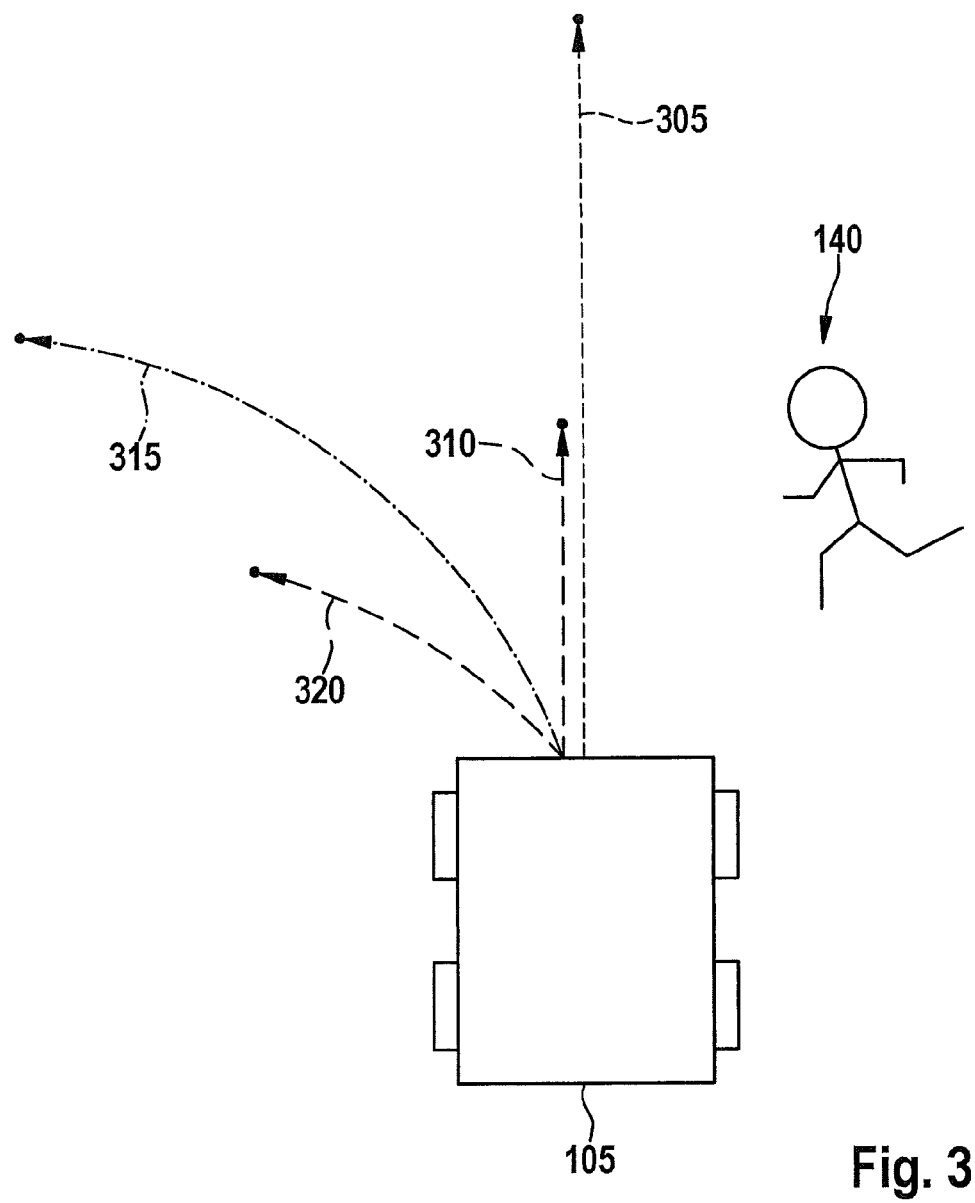
FIG. 3 shows different situations between the object and the motor vehicle from FIG. 1.

FIG. 3 shows a diagram of different situations between object 140 and motor vehicle 105 from FIG. 1. Starting from the situation depicted in FIG. 1, this shows different driving maneuvers, which may be carried out using motor vehicle 105 to avoid a collision or an accident with object 140 or to reduce accident consequences in an accident. A first driving maneuver 305 relates to an instantaneous driving maneuver of motor vehicle 105, which may be controlled by a driver of motor vehicle 105, for example. A steering angle and an acceleration of motor vehicle 105 may be maintained. In the specific embodiment illustrated here, motor vehicle 105 drives straight ahead in this case and does not decelerate.

In a second driving maneuver 310, there is a deceleration, but no evasive maneuver is initiated with the aid of a transverse control of motor vehicle 105. However, after a third driving maneuver 315, there is no deceleration, but there is an intervention in steering 135 to evade object 140.

A fourth driving maneuver 320 relates to a combination of driving maneuvers 310 and 315. Both braking and evasion are implemented in this case.

Driving maneuvers 305 through 320 depicted here are associated with trajectories, indicating at which locations motor vehicle 105 will be positioned at which points in time. A further determination of future locations may also be carried out for object 140. These determinations are not carried out in the form of trajectories, for reasons of determination complexity, but instead as the quantity of predicted states of object 140. Uncertainties regarding a position of object 140, regarding its movement parameters or regarding an intention of object 140 may be modeled as fuzzy uncertainties, i.e., as a probability distribution.

It is thus possible to determine, in a combined manner, with which driving maneuver 305 through 320 a collision with object 140 is most probable and with which driving maneuver the consequences of the collision or accident are the least serious.

What is claimed is:

1. A method for determining a driving maneuver for a motor vehicle, the method comprising:
   detecting at least one external object;
   ascertaining whether an accident, in which the motor vehicle is to collide with the detected external object, is imminent;
   responsive to ascertaining that the accident is imminent:
      assigning a plurality of characteristic variables, each characteristic variable indicating a probability of accident damage, to a corresponding driving maneuver of the motor vehicle from a set of different driving maneuvers available for the motor vehicle;
      selecting, from the set of different driving maneuvers, a driving maneuver assigned to a characteristic variable that is indicative of the least accident damage; and
      controlling the motor vehicle to carry out the selected driving maneuver,
   wherein the set of different driving maneuvers includes at least an instantaneous driving maneuver and an additional driving maneuver.

2. The method of claim 1, wherein:
   the instantaneous driving maneuver is controlled by a driver of the motor vehicle and a first characteristic variable is assigned to the instantaneous driving maneuver,
   within the characteristic variables, lower values indicate lower probability of accident damage and higher values indicate greater probability of accident damage, and
   a driving maneuver assigned to a characteristic variable that has a lower value than the first characteristic variable is selected.

3. The method of claim 1, wherein the assignment of each characteristic variable is based on the probability of accident damage being greater than a predetermined value.

4. The method of claim 1, the method further comprising:
   determining a collision speed of the motor vehicle for each driving maneuver, and
   wherein the characteristic variables are assigned based on the collision speeds.

5. The method of claim 1, wherein, for each driving maneuver:
   a distribution density of collision speeds of the motor vehicle is determined, and
   the corresponding characteristic variable is assigned based on the distribution density.

6. The method of claim 1, wherein the external object includes a person and the characteristic variables account for an arrangement of transportation of the person.

7. The method of claim 1, wherein the characteristic variables are based on personal injuries.

8. The method of claim 1, wherein each characteristic variable accounts for a collision point of the external object on the motor vehicle.

9. A non-transitory computer readable medium having a computer program, which is executable by a processor, comprising:

a program code arrangement having program code for determining a driving maneuver for a motor vehicle, by performing the following:
- ascertaining an imminent accident in which the motor vehicle is to collide with a detected external object;
- assigning a plurality of characteristic variables, each characteristic variable indicating a probability of accident damage, to a corresponding driving maneuver of the motor vehicle from a set of different driving maneuvers available for the motor vehicle;
- selecting, from the set of different driving maneuvers, a driving maneuver assigned to a characteristic variable that is indicative of the least accident damage; and
- controlling the motor vehicle to carry out the selected driving maneuver, wherein the set of different driving maneuvers includes at least an instantaneous driving maneuver and an additional driving maneuver.

10. A device for determining a driving maneuver for a motor vehicle, comprising:
- a detection unit for detecting an external object;
- a processing unit for selecting the driving maneuver for the motor vehicle, by performing the following:
  - ascertaining an imminent accident in which the motor vehicle is to collide with the external object,
  - assigning a plurality of characteristic variables, each characteristic variable indicating a probability of accident damage, to a corresponding driving maneuver of the motor vehicle from a set of different driving maneuvers available for the motor vehicle, and
  - selecting, from the set of different driving maneuvers, a driving maneuver assigned to a characteristic variable that is indicative of the least accident damage; and
- a control unit for controlling the motor vehicle according to the selected driving maneuver, wherein the set of different driving maneuvers includes at least an instantaneous driving maneuver and an additional driving maneuver.

11. The method of claim 1, wherein the control of the motor vehicle includes an operation of at least one of: releasing brakes of the motor vehicle, changing a steering angle of the motor vehicle, and accelerating the motor vehicle.

12. The method of claim 11, wherein the operation involved in the control of the motor vehicle requires one of: overriding the instantaneous driving maneuver and intensifying the operation of the instantaneous driving maneuver.

13. The method of claim 1, wherein:
- within the characteristic variables, higher values indicate lower probability of accident damage and lower values indicate greater probability of accident damage, and
- wherein a driving maneuver assigned to a characteristic variable that has a higher value than the first characteristic variable is selected.

14. The computer readable medium of claim 9, wherein:
- the instantaneous driving maneuver is controlled by a driver of the motor vehicle and a first characteristic variable is assigned to the instantaneous driving maneuver,
- within the characteristic variables, lower values indicate lower probability of accident damage and higher values indicate greater probability of accident damage, and
- a driving maneuver assigned to a characteristic variable that has a lower value than the first characteristic variable is selected.

15. The computer readable medium of claim 9, wherein the control of the motor vehicle includes an operation of at least one of: releasing brakes of the motor vehicle, changing a steering angle of the motor vehicle, and accelerating the motor vehicle.

16. The computer readable medium of claim 15, wherein the operation involved in the control of the motor vehicle requires one of: overriding the instantaneous driving maneuver and intensifying the operation of the instantaneous driving maneuver.

17. The device of claim 10, wherein:
- the instantaneous driving maneuver is controlled by a driver of the motor vehicle and a first characteristic variable is assigned to the instantaneous driving maneuver,
- within the characteristic variables, lower values indicate lower probability of accident damage and higher values indicate greater probability of accident damage, and
- a driving maneuver assigned to a characteristic variable that has a lower value than the first characteristic variable is selected.

18. The device of claim 10, wherein the control of the motor vehicle includes an operation of at least one of: releasing brakes of the motor vehicle, changing a steering angle of the motor vehicle, and accelerating the motor vehicle.

19. The device of claim 18, wherein the operation involved in the control of the motor vehicle requires one of: overriding the instantaneous driving maneuver and intensifying the operation of the instantaneous driving maneuver.

* * * * *